FIG. 2

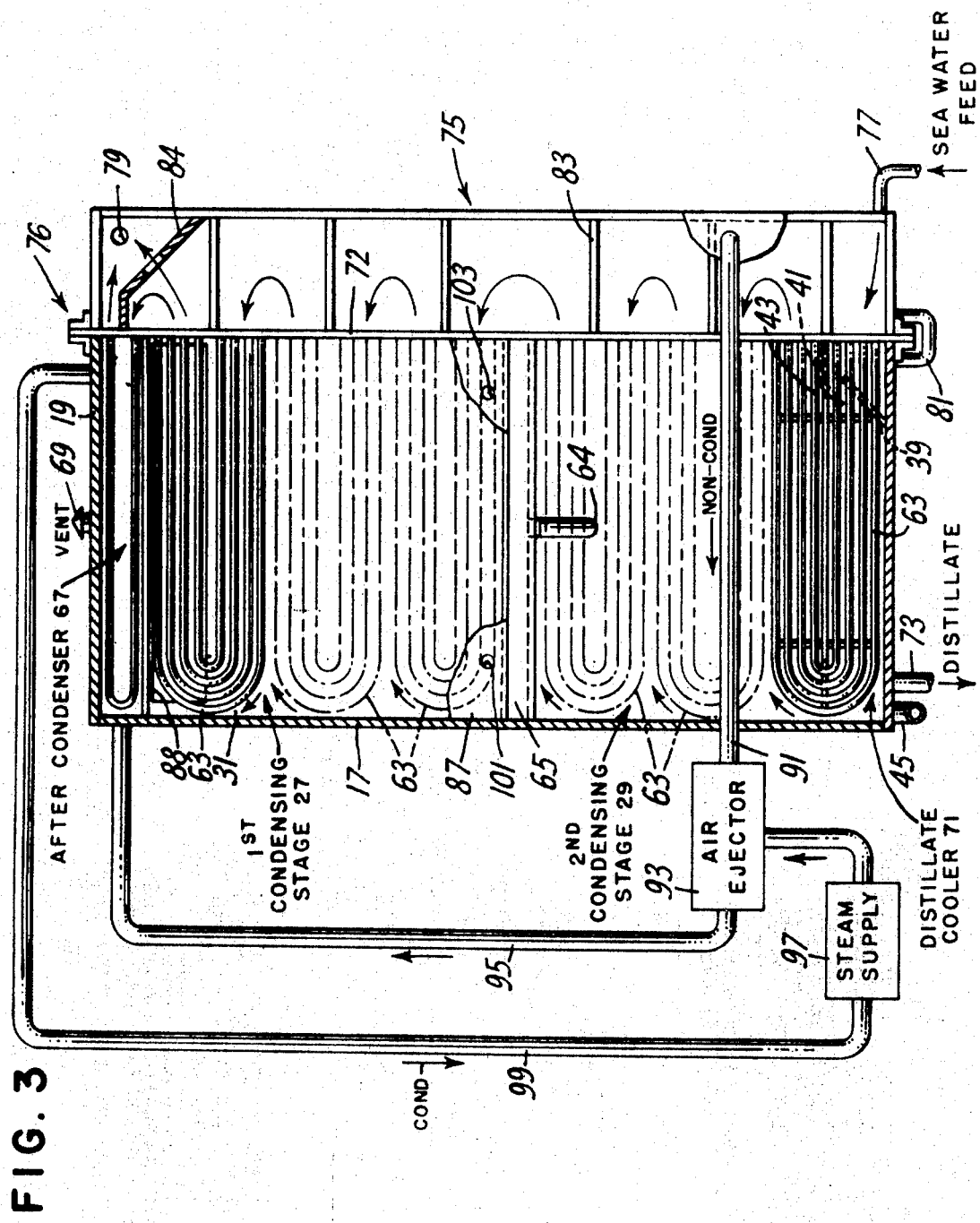

3,730,848
MULTI-STAGE FLASH EVAPORATOR FOR
DISTILLING BRINES
Valentine Walter Kowalski, East Lyme, Conn., assignor
to Riley-Beaird, Inc., Chicago, Ill.
Filed Aug. 21, 1970, Ser. No. 65,999
Int. Cl. B01d 3/00, 3/10, 3/02
U.S. Cl. 202—173                                11 Claims

ABSTRACT OF THE DISCLOSURE

This application covers a flash evaporator having two flash stages connected in series and condensing stages located between the flash stages, the condensing stages being stacked one on the other. The first condensing stage includes an after condenser and the second condensing stage an integral distillate cooler. In addition, a heater is integrally mounted in the upper portion of the first flash stage. An evaporator, in accordance with the invention, presents no hot walls for salt buildup. Vapor and distillate flow countercurrent to infeed.

---

This invention relates generally to distillation apparatus and more particularly to a particular configuration for flash evaporators.

Flash evaporators are well-known and utilize many intricate configurations in design, varying greatly in size, capacity, and efficiency. Consequently, costs of construction and operation vary greatly depending on those factors and the end-use in which such equipment is utilized. For example, small, compact highly efficient evaporators are generally desirable for marine use, that is, on ships, boats, submarines and the like. On the other hand, for land based use, where space is of less importance, greater size can be tolerated. However, regardless of use, whether on land or water, there is a need to keep capacity and efficiency as high as possible and design configuration as simple as possible in order to keep manufacturing and operating costs to a minimum. The present invention provides a two-stage flash evaporator which fulfills these needs with respect to simplicity, compactness, efficiency, capacity, and economics in an evaporator configuration that is suitable for marine and land use in distillation processes, such as in the treatment of brine and distillation of sea water, although it is to be understood that other liquids may be subjected to distillation in the apparatus of the invention. However, in the interest of simplicity, the present invention is disclosed herein as it applies particularly to sea water treatment.

In order to understand the present invention more fully, reference is made to the following description, which is to be taken in conjunction with the accompanying drawings wherein:

FIG. 2 is a sectional elevational view of the evaporator shown in FIG. 1 with the front wall partially removed and showing the heater integrally mounted in the shell; and FIG. 3 is a side view in elevation of the evaporator of this invention taken across line 3—3 of FIG. 2.

Figure 1:
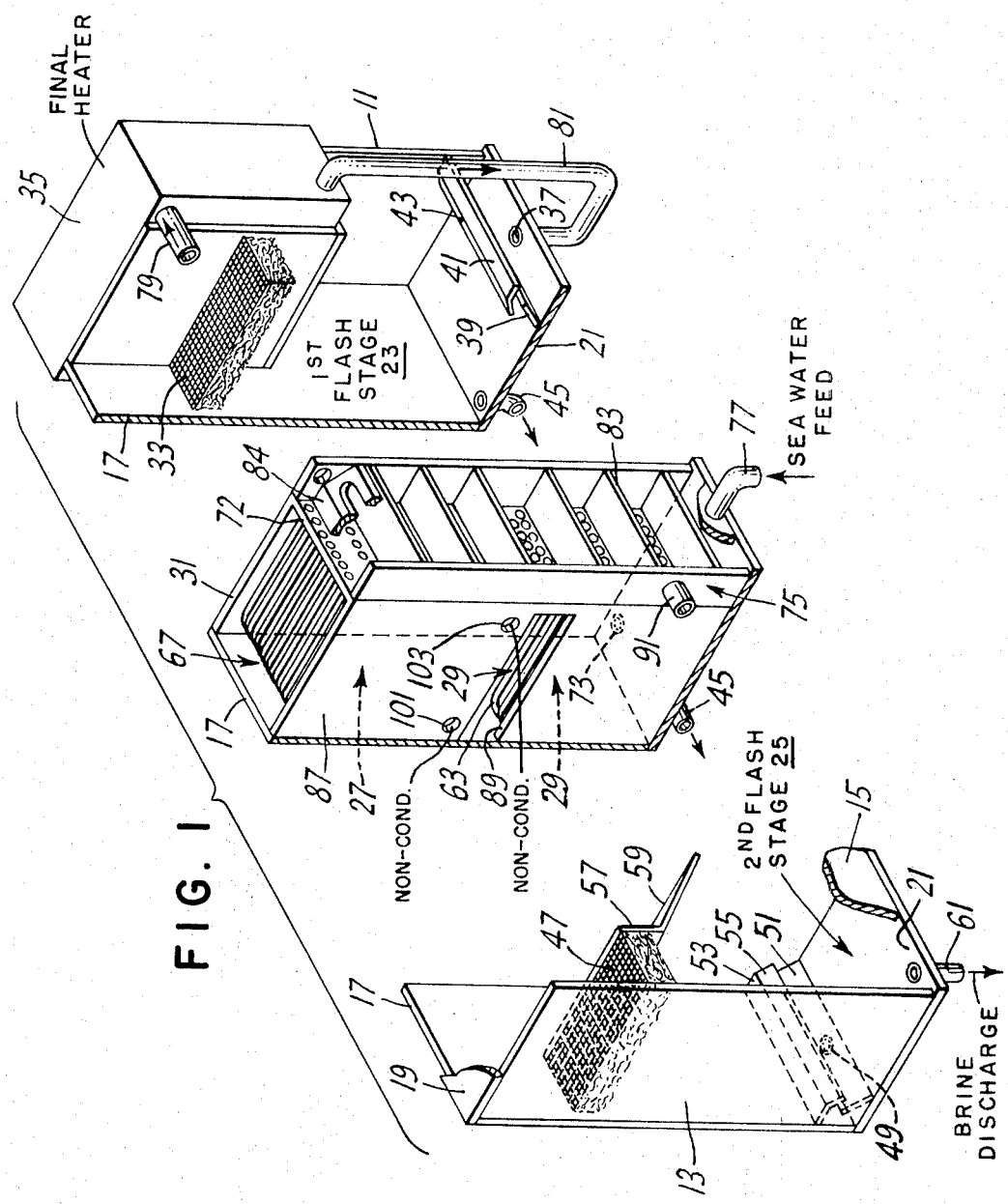
FIG. 1 is an isometric view in elevation of the two-stage flash evaporator of the invention having the front and top walls partially removed to show the evaporator separated into flash sections and a condenser section and reveal the internal construction.
Figure 2:
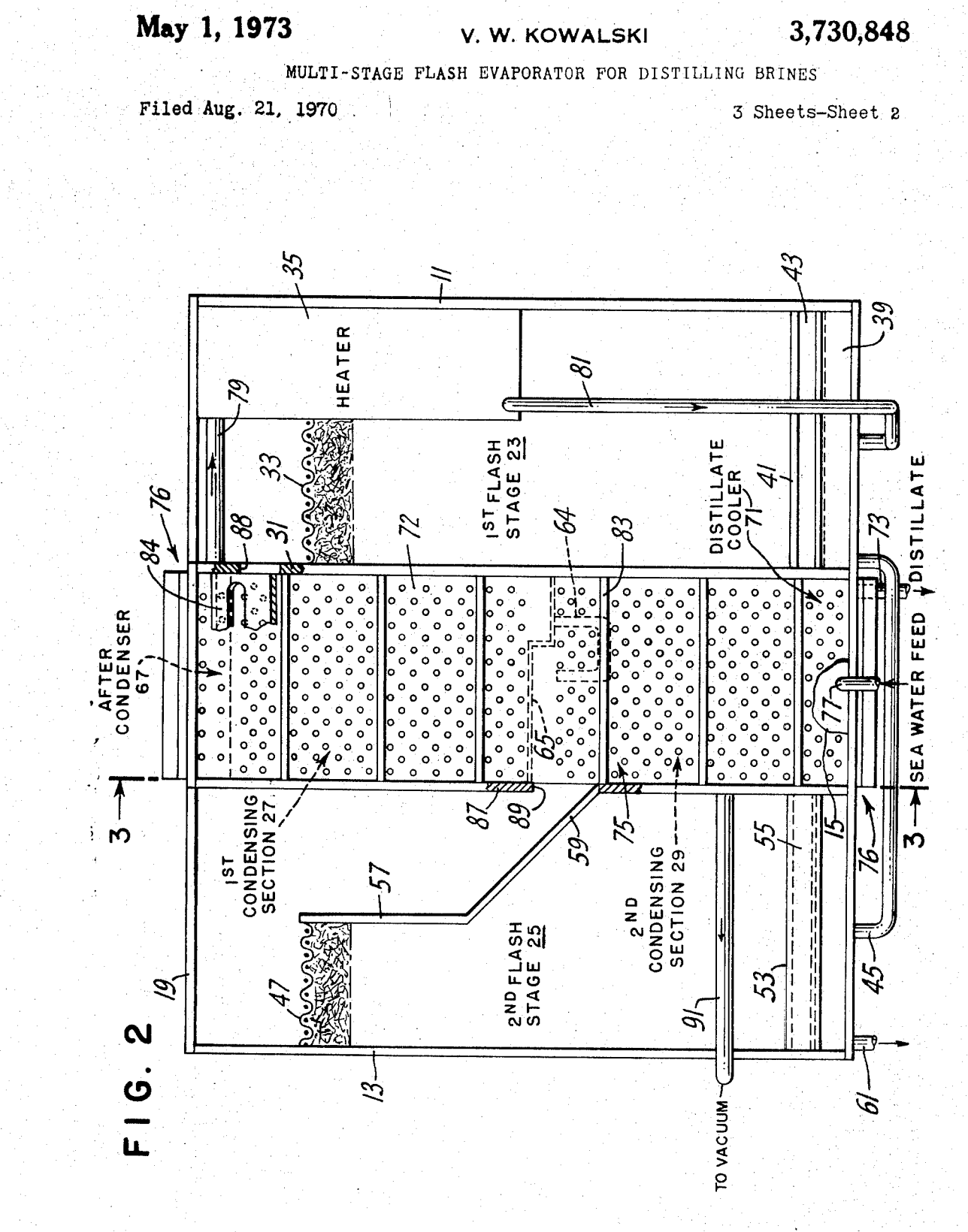

Referring more particularly to FIG. 1, a two-stage evaporator in accordance with the invention comprises an outer shell having side walls 11 and 13, front and back walls 15 and 17, respectively, and top and bottom walls 19 and 21, respectively. The walls form the shell-like structure within which are three horizontally disposed compartments. The two end compartments are comprised of first and second flash stages, generally designated by numerals 23 and 25, and the middle compartment includes first and second condensing stages, generally designated by 27 and 29 in FIG. 2. It is to be noted that top wall 19 may be horizontal as shown in FIG. 2 or shaped to form a ledge for mounting a heater externally of the shell as shown in FIG. 1.

The first flash stage 23 is formed by front wall 15, side wall 11, back wall 17, bottom wall 21, top wall 19, and the vertically disposed interior separating panel 31, extending upwardly toward the top wall, such stage comprising an upper vapor chamber and a lower liquid chamber. Located in the upper area or portion of the first flash stage 23 is a mesh separator 33. A heater 35 is located above the first flash chamber and derives its energy from any suitable source. It may also be located within the shell, that is, integral with the evaporator unit, as shown in FIG. 2. The mesh separator is supported adjacent the upper edge of panel 31 and separates small brine particles from vapor when brine is undergoing flashing in the first flash stage.

The bottom wall 21 is provided with an opening 37 forming a liquid entrant orifice. An evaginated venturi entrance formed by an inclined but generally upstanding plate 39 and a top plate 41 provided with a downwardly bent lip 43 is disposed on the inside of front wall 15 and cooperates with opening 37. Plate 39 extends upwardly from the bottom wall 21 and top plate 41 and lip 43 extend completely across the width of the first flash stage 23.

As brine passes through the evaginated venturi, it flashes into vapor. The vapor passes upwardly into the upper portion of the first flash stage and through the mesh separator and then into the first condensing stage 27. Brine, which is not flashed, passes to the rear of the first flash stage and is led by suitable means, such as conduit 45, into the second flash stage where an evaginated venturi similar to that in the first flash stage is dispose on the inner side of the rear wall of that flash stage.

In the second flash stage, the brine is evaporated in a manner similar to that in the first stage and the vapor passes through another mesh separator 47 and then to the second condensing stage 29.

Describing the second flash stage 25 more particularly, it is formed by the side, front, and back walls 13, 15, and 17, respectively, and then by the bottom wall 21. The bottom wall 21 is provided with an opening 49 forming a liquid entrant orifice. As mentioned hereinbefore, an evaginated venturi entrance similar to that in the first flash stage is disposed on the interior side of the back wall of the second flash stage. The venturi is made up of an inclined generally upstanding plate 51 and a top plate 53 provided with a downwardly bent lip 55 and cooperates with the entrant orifice 49 in the bottom wall 21 of the second flash stage 25. The plate 51 extends upwardly from the bottom wall 21 and top plate 53 and lip 55 extend completely across the width of the second flash stage. In order to separate the second flash stage into flashing and collecting areas, an upwardly extending panel 57 is disposed in the interior area formed by the front, side, back, and bottom walls. This panel extends upwardly in an irregular course forming a trap 59 stopping short of the top wall and has mesh separator 47 supported adjacent its upper edge and on the external walls. Consequently, when brine is evaporated, the vapor passes upwardly through the mesh screen and into the upper portion of the flash stage where it is collected and falls into the trap leading to the second condensing stage. In addition, disposed in the lower portion of the front wall of the second flash stage is an opening provided with suitable means, such as conduit 61, to drain off any unflashed brine. Such unflashed brine may be disposed of as waste or carried back to the first flash stage for further processing, if desired.

As best seen in FIGS. 2 and 3, the first and second condensing stages 27 and 29, respectively, are located between the first and second flash stages, the first condensing stage being disposed above the second condensing stage. Both condensing stages have long-tube condensing means 63 passing through them and distillate from the first flash stage, having been condensed in the first condensing stage, is passed into the second condensing stage through a loop seal 64 from the area above the trap plate 65 shown in FIG. 2. Thus, the condensing stages are connected in series. Located in the uppermost portion, that is the upstream area, of the first condensing stage is an after condenser 67, which condenses motive steam from an air ejector, as explained and identified hereinbelow. The shell side of the after condenser is open to the atmosphere by means of vent 69, as illustrated in FIG. 3.

In the lower portion on downstream area of the second condensing stage is an integral distillate cooler 71. The distillate cooler receives distillate which has collected in the first and second condensing stages and is equipped with a suitable means, such as conduit 73 for collecting and carrying the product off to storage or other means (not shown).

Affixed to the front wall 15 and extending from the bottom to the top across the front of the first and second condensing stages is a removable manifold or water box header generally designated by 75 and affixed to the wall 15 in any suitable manner such as by flanges 76, as illustrated in FIGS. 2 and 3. The manifold is equipped with suitable means, such as conduit 77 near the bottom, that is, near the downstream area of the second condensing stage, for carrying sea water from a source. The sea water is then led into the long-tube condensing means 63, passing upwardly through the various stages until it reaches the top portion of the manifold, where it is then carried by suitable means, such as conduit 79, located near the upstream area of the first condensing stage, to heater 35 located above the upper portion of the first flash stage. Suitable means, such as conduit means 81 carries heated sea water from heater 35 to the first flash stage.

Manifold 75 is divided into a series of compartments by a plurality of horizontally disposed members, typical of which is member 83. The precise number of compartments in the manifold can vary. However, as may be seen in both FIGS. 1 and 3, the number of compartments is sufficient to permit infeed to flow through the long-tube condensing means 63 and to flow out from such means before being led to the next compartment. In this regard, it is to be noted that the long-tube condensing means 63 are made up of a series of U-tubes having their open ends secured in apertures in tube sheet 72 which may or may not form an integral part of the outer shell, and the tubes extend in stages from the bottom of the evaporator through the second and first condensing stages and into the after condenser 67 disposed above the first condensing stage. As infeed enters the first compartment of the manifold, it is carried to a plurality of U-tubes disposed in the lowermost portion of the condensing stage, which form the integral distillate cooler. In this condensing stage, the infeed makes one pass through the U-tubes from front to rear and is led out of the U-tubes to the next higher compartment of the manifold and back into the U-tubes in that condensing stage before progressing to the subsequently higher compartment of the manifold.

Finally, when the infeed reaches the uppermost compartment of the manifold, part of it passes through a single bank of U-tubes, which are disposed in the after condenser 67. As it flows from this bank of U-tubes, it is then passed through the conduit 79 to the heater 35. It is to be noted that the uppermost compartment of the manifold is provided with a plate 84 containing an opening so that part of the infeed is directed into the condensing means of the after condenser and the remaining portion of it is led directly to the heater 35.

The particular number of tubes employed as long-tube condensing means will vary depending upon the capacity desired for a given evaporator in accordance with the invention. For example, in the design illustrated in the attached drawings the banks of tubes are generally four high and one wide for each thousand gallons per day capacity. An 8,000 gallons/per day plant, therefore, will be eight tubes wide and the tubes per pass is 32. On the other hand, a 20,000-gallon per day plant would have a width of 20 tubes and be four tubes high, that is, 80 tubes per pass. In the particular construction shown, the bank of tubes in the after condenser 67 is one high and one wide for each thousand gallons per day capacity.

Referring now more particularly to FIGS. 2 and 3, the first and second stage condensing sections 27 and 29, respectively, are separated from the flash sections of an evaporator in accordance with the invention by vertically disposed panels 31 and 57, mentioned hereinabove, and panel 87. These panels from the interior walls of the evaporator and separate the construction into clearly defined compartments. Both panels 31 and 87 contain openings 88 and 89 to permit vapor to pass from the flash sections into the respective condenser sections. Moreover, as mentioned hereinbefore, the condenser sections are arranged in series, thereby permitting distillate to pass from the first condenser into the second condenser and thence to the integral distillate cooler after which it is collected for storage or use.

In utilizing the evaporator of this invention, vapor, which is flashed in the flash chambers normally contains noncondensable materials, such as air and the like. In order to remove these noncondensable materials from the evaporator, a vacuum arrangement is employed. This is accomplished by conduit means 91, FIG. 3, disposed on the front wall near the lower portion of the second condenser. This conduit means is equipped with an air ejector 93, FIG. 3, and is connected to a steam line 95, supplied with steam from a source generally designated as 97. The steam line 95 is connected to the after condenser 67, which is vented to the atmosphere by vent 69 or in any other suitable manner. An additional conduit means 99 returns condensed steam to the steam source 97 from which it is recycled. In order to remove noncondensables from the distillate in the first stage condenser, the vertically disposed panel 87 is provided with a plurality of openings, such as those shown in FIG. 3 at 101 and 103. Suitable pumps (not shown) are employed as necessary to move infeed, remove distillate and remove unflashed brine. However, unflashed brine infeed moves from the first stage evaporator section to the second stage evaporator section and distillate is moved through the condensing stages by the differential pressure in the various stages, which is caused by the lower temperature of the infeed entering the evaporator and lowering the temperature in the second flash stage below the temperature of the first flash stage, which receives heated sea water from the heater 35.

An evaporator in accordance with this invention operates as follows. Infeed brine sea water from a source is piped to the manifold 75 through conduit 77 and passes through the long-tube condensing means 63 upwardly through the second condensing stage 29 to the first condensing stage 27 and to the after condenser 67. At this point, that is, the last compartment of the manifold, part of the infeed is passed through the after condenser 67, collected and carried along with the original infeed through conduit 79 to the heater 35. After being heated, the sea water is carried through conduit 81 to the first flash stage 23 into which it is introduced by way of the evaginated venturi and flashing takes place. Unflashed brine then exits from the first flash stage through conduit means 45 and is carried to the second flash stage where it is introduced into the evaginated venturi located on the rear wall of that stage. Excess brine, which does not flash in the second stage is carried off to waste or for recycling by a suitably disposed conduit means 61 in the second stage. Meanwhile, in both flash stages, vapor which has been formed passes upwardly through the mesh separators 33 and 47 and thence into the first and second condensing stages 27 and 29, respectively. Distillate passes downwardly through the first condensing stage through the loop seal 64 and comingles with distillate in the second condensing stage. The distillate from both stages then passes downwardly into the integral distillate cooler 71 from which it is collected through suitably located conduit means 73 for use or storage. Consequently, an evaporator constructed in accordance with this invention has the advantage of utilizing the sea water infeed to condense distillate after which the infeed is passed to the heater and subsequently to the flash stages where it is flashed into product. At the same time by means of the vacuum arrangement and steam scrubber, noncondensables, such as air and the like, are removed from the evaporator and vented to the air and the steam is recycled for further use.

Consequently, an evaporator in accordance with the invention presents a construction which is simple in design, efficient in operation, and contain substantially no externally mounted parts while at the same time providing maximum utilization of infeed to cool distillate and subsequent utilization of infeed to form distillate.

In addition, an evaporator constructed in accordance with the invention presents a configuration which eliminates hot walls which result in the buildup of salt deposits. The elimination of hot areas is achieved by placing the condensing stages between the evaporator stages, thereby permitting further utilization of the infeed to maintain the flash chambers in a temperature condition which while high enough to accomplish flashing is still sufficiently low to prevent salting out and collection of such salt on the walls of the flash stages.

Numerous other advantages of this invention will be readily apparent to those skilled in the art. Consequently, many variations may be made in the invention without departing from the spirit and scope thereof. Therefore, it is to be understood that the above description is merely illustrative and the invention should not be limited except as defined in the appended claims.

What is claimed is:

1. Evaporator apparatus comprising,
   first and second flash evaporator stages disposed in spaced relationship to provide a space therebetween,
   each of said evaporator stages including a vapor chamber adapted to receive vapor therein, each said vapor chamber being interiorly bounded by a wall that separates said vapor chamber from said space between the two evaporator stages,
   means for feeding heated liquid to the first one of said evaporator stages,
   means for feeding unevaporated heated liquid from the first to the second one of said evaporator stages,
   first and second condensing means for receiving and condensing vapor from said vapor portion of a respective one of the first and second evaporator stages,
   said two condensing means being disposed in the space between the evaporator stages to substantially completely separate said two vapor portions, thereby to minimize excessively hot areas and resultant buildup of deposits on said interior walls,
   means for discharging unevaporated liquid from said second evaporator stage, and
   means for collecting distillate from said two condensing means.

2. The evaporator apparatus claimed in claim 1 wherein said two condensing means are disposed one above the other, and wherein each of said evaporator stages is disposed on a respective side of the vertically disposed condensing means.

3. Evaporator apparatus comprising a hollow shell-like structure formed of metal plates,
   means extending through said shell-like structure for dividing it into two end compartments and a middle compartment,
   first and second flash evaporator means each located in a respective one of said end compartments,
   means for feeding heated liquid to the first one of said evaporator means located in a first end compartment,
   means for feeding unflashed liquid from said first end compartment to the second evaporator means located in the second end compartment,
   each of said end compartments including a vapor chamber adapted to receive vapor from its a respective flash evaporator means, each vapor chamber in its respective end compartment being interiorly bounded by a respective one of said dividing means defining in part said middle compartment,
   first and second vapor condensing means disposed in said middle compartment for receiving and condensing vapor from the vapor portion of a respective one of said end compartments, said condensing means separating said vapor chambers of the end compartments and thereby eliminating common transverse hot walls between the two vapor chambers,
   means for discharging unflashed liquid from the second end compartment, and
   means for collecting distillate from said two condensing means located in the middle compartment.

4. A flash evaporator comprising,
   a hollow shell-like structure formed of metal plates,
   means extending through said shell-like structure for dividing it into two non adjacent end compartments with a middle compartment therebetween,
   first and second flash evaporator means respectively located in said two end compartments,
   means for feeding heated liquid to the first one of said flash evaporator means located in a first end compartment,
   means for feeding liquid from said first flash evaporator means to the second flash evaporator means located in the second end compartment,
   first and second vapor condensing means located in said middle compartment for, respectively, condensing vapor from said first and second flash evaporator means, said condensing means separating the means that divide the shell-like structure into two end compartments and thereby eliminating common transverse hot wall between the two flash evaporator means,
   means for discharging unflashed liquid from the second flash evaporator means located in the second end compartment, and
   means for collecting distillate from said two condensing means located in the middle compartment.

5. The combination claimed in claim 4 wherein said first and second condensing means are arranged one over the other in said middle compartment.

6. The combination claimed in claim 4 wherein the condensing means includes
   means in said middle compartment for passing input liquid feed through the two condensing means in indirect heat exchange relationship with flash vapor to condense same from said flash evaporator means and to heat the input liquid feed during its passage through the middle compartment.

7. The combination claimed in claim 4 wherein the means for collecting distillate includes
   means located in the middle compartment below said two condensing means for receiving distillate from said condensing means disposed thereabove.

8. The combination claimed in claim 7 and further including
means for first passing said input liquid feed through said means for receiving distillate before the liquid feed passes through said first and second condensing means, thereby to cool said distillate, and
means for withdrawing said cooled distillate from the middle compartment.

9. A two stage flash evaporator comprising
a hollow shell-like structure formed of metal plates,
first and second metal plate divider means extending transversely through said structure for dividing it into two nonadjacent end compartments with a space therebetween,
first and second flash evaporator means respectively located in said two end compartments,
means for feeding heated liquid to the first one of said flash evaporator means located in a first end compartment,
means for feeding liquid from said first flash evaporator means to the second flash evaporator means located in the second end compartment,
first and second vapor condensing means located one above the other in said space between said end compartments for, respectively, receiving and condensing vapor from said first and second flash evaporator means, said condensing means separating said metal plate divider means and eliminating common hot walls between the two flash evaporator means, thereby minimizing buildup of deposit on walls of the flash evaporator means,
means for providing a pressure seal between the two condensing means,
means for discharging unflashed liquid from the second flash evaporator means, and
means for collecting distillate from said two condensing means.

10. A compact two stage sea water evaporator comprising,
a shell-like structure formed of metal plates,
metal plate dividing means extending transversely through said structure at spaced locations for dividing said structure into three horizontal compartments arranged with the middle compartment completely separating the two end compartments,
first and second flash evaporator means respectively located in said end compartments,
means for feeding heated sea water to the flash evaporator in a first one of the end compartments,
means for passing brine from said first end compartment to the flash evaporator means in said second end compartment,
first and second condensing means disposed one above the other in said middle compartment,
means for passing vapor from the first end compartment to said first condensing means,
means for passing vapor from the second end compartment to said second condensing means,
means providing a pressure seal between the two condensing means,
means for withdrawing brine from the second end compartment, and
means located below the two condensing means for collecting distillate.

11. A compact two-stage flash evaporator comprising
an outer shell,
first and second spaced apart vertical panels each extending transversely through said shell to form therein three successively adjacent compartments wherein a middle compartment separates two end compartments,
first and second evaginated venturi means each located in an end compartment for forming respective flash evaporator means therein,
an infeed heater located adjacent a first one of said flash evaporator means,
conduit means for passing heated infeed liquid from the heater to the evaginated venturi means in the first one of said end compartments,
conduit means for passing unflashed liquid from the first end compartment to the evaginated venturi means in the second one of said end compartments,
means for withdrawing unflashed liquid from the second end compartment,
first and second condensing means arranged one above the other between said spaced apart panels,
each of said panels including an opening therethrough for permitting the top and bottom condensing means to receive vapor from the first and second flash evaporator means, respectively,
means extending between said panels for providing a pressure seal between said two condensing means,
said two condensing means including respective groups of condensing tubes,
infeed manifold means attached to said shell and communicating with said groups of condensing tubes for passing infeed successively through said groups of tubes thereby to condense vapor from said two flash evaporator means and to heat said infeed,
conduit means for introducing infeed to the bottom of said manifold means,
conduit means for passing infeed from the top of said manifold means to said heater, and
means located below the bottom one of the condensing means for collecting distillate from said condensing means.

References Cited

UNITED STATES PATENTS

| | | | |
|---|---|---|---|
| 3,488,260 | 1/1970 | Gilbert | 202—173 X |
| 3,192,132 | 6/1965 | Loebel | 202—173 |
| 3,146,177 | 8/1964 | Chalmers et al. | 202—160 |
| 3,532,152 | 10/1970 | Cartinhour | 203—11 X |
| 3,551,298 | 12/1970 | Lichtenstein | 203—11 X |
| Re. 25,232 | 8/1962 | Goeldner | 203—11 |
| 2,398,068 | 4/1946 | Worthen et al. | 203—10 X |
| 2,893,926 | 7/1959 | Worthen et al. | 202—173 X |
| 3,259,562 | 7/1966 | Goeldner | 203—3 |
| 3,372,096 | 3/1968 | Tidball | 159—2 MSX |
| 3,395,084 | 7/1968 | Loebel et al. | 202—173 |
| 3,448,013 | 6/1969 | Bailie | 159—2 MSX |
| 3,481,835 | 12/1969 | Carnavos | 159—18 X |

NORMAN YUDKOFF, Primary Examiner

J. SOFER, Assistant Examiner

U.S. Cl. X.R.

203—11